United States Patent [19]

Muller, deceased

[11] 3,882,758

[45] May 13, 1975

[54] TOOL SPINDLE HAVING A CLAMPING DEVICE FOR MILLING TOOLS

[75] Inventor: Johann Muller, deceased, late of Unterhaching, Germany, by Katharina Muller, legal representative

[73] Assignee: Friedrich Deckel Aktiengesellschaft, Munich, Germany

[22] Filed: May 11, 1973

[21] Appl. No.: 359,256

[30] Foreign Application Priority Data

May 29, 1972 Germany............................ 2226001

[52] U.S. Cl................... 90/11 A; 279/1 K; 408/239
[51] Int. Cl.............................................. B23b 5/26
[58] Field of Search ............ 90/11 A; 408/238, 239; 279/1 K, 1 ME, 91

[56] References Cited

UNITED STATES PATENTS

| | | | |
|---|---|---|---|
| 1,398,341 | 11/1921 | Pfunder................................ | 279/1 K |
| 3,112,117 | 11/1963 | Wahlstrom et al. ................... | 279/91 |
| 3,197,219 | 7/1965 | Wahlstrom et al.................... | 279/1 K |

Primary Examiner—Gil Weidenfeld
Attorney, Agent, or Firm—Woodhams, Blanchard and Flynn

[57] ABSTRACT

Clamping device for a collet chuck having a threadedly mounted cap for urging the collet into and out of cone means. For effecting relative rotation between the threaded cap and the cone means, there is provided manually operable means locking the rotatable spindle through said cone means non-rotatably with respect to the frame of the machine and then effecting through suitable gear means the desired rotation of said cap. In the operation thereof, a manually operable device is moved by one motion for effecting engagement between the spindle and the frame of the machine, said motion at the same time drivingly engaging the periphery of said cap, as through gear teeth, said means then being movable by another motion to effect rotation of said cap with respect to said locked spindle. As a safety measure, said means also prevents rotation of the spindle until said means are disengaged from the cap.

9 Claims, 3 Drawing Figures

TOOL SPINDLE HAVING A CLAMPING DEVICE FOR MILLING TOOLS

FIELD OF THE INVENTION

The invention relates to a tool spindle as for milling tools or the like, same having a clamping device comprising a collet which is arranged on the spindle and held by the cap which can be screwed onto the spindle end.

BACKGROUND OF THE INVENTION

It is customary to provide a slotted collet to hold a tool and to cause same to be urged into a spindle cone by a screw cap so that the tool is clamped. One difficulty exists in present practice in that the spindle is normally freely supported or in any case supported for easy rotation. Such support does not place a holding moment against the rotational moment required for tightening and releasing the screw cap so that means for locking the spindle must be provided.

It is already known for this purpose to mechanically lock the spindle or the drive coupled with it. However, this solution is expensive and has the disadvantage that the locking device is easily overlooked when in engaged condition with the result that the machine may be damaged upon starting.

In another known arrangement the spindle is constructed as a hexagon near the spindle end so that during tightening or loosening of the screw cap it can be held by means of a second wrench. This construction has the disadvantage that the operator must handle one wrench for the screw cap and one for the spindle so that for holding of the tool, particularly during loosening, there is no hand free and there is danger that the tool may fall out of the collet and onto the workpiece.

The purpose of the invention is to provide a tool spindle having a clamping device of the type above mentioned in which a tightening and loosening of the screw cap is possible by one hand without the necessity of separate blocking devices being provided.

SUMMARY OF THE INVENTION

This purpose is attained according to the invention by a key member which rotatively fixes the spindle with respect to the sleeve or a housing part surrounding said spindle, on which key member there is arranged a gear which can be driven by a one-arm operating lever, and which gear engages external teeth provided on the screw cap.

The key member is moved into such position wherein it connects the spindle to the surrounding sleeve, and the spindle is thereby locked. At the same time the gear which is rotatably arranged on the key member engages the teeth on the screw cap. By operating the operating lever the screw cap can be tightened or loosened by one hand, whereby the other hand is free for holding the tool in the collet.

A clamping key for hand drills is already known which is supported relative to the spindle and drives a screw cap through a bevel gear which is integral with the clamping key. Since the spindle can easily be rotated, the operating lever which is arranged on the clamping key must have two arms so that no torque with respect to the spindle axis is produced. This means that again either both hands are needed for clamping or loosening or that this solution is limited to small tools or machines requiring only small clamping moments which can be produced by a rotary motion of only one hand.

In the inventive solution, however, the spindle is stopped relative to a rotationally fixed structural part — sleeve or housing part — so that now even by a one-arm operating lever a substantial torque can be produced.

According to one characteristic of the invention, the key member is constructed as a finger or the like which can be inserted between spindle and sleeve, and which finger holds, either by frictional resistance or positively, the spindle rotatively fixed with respect to the sleeve. In a preferred exemplary embodiment of the invention the connection is positive, whereby the finger which forms the key member engages along one side thereof a longitudinal groove constructed on the surface of the spindle and on the other side thereof the teeth which are provided on the inside of the sleeve. In this manner the spindle is supported against the key member and same in turn against the sleeve.

In one embodiment of the invention the drivable gear is arranged eccentrically to the axis of the screw cap nut rotatably on the key member and engages with spur gear means a corresponding spur gear means of the screw cap. Thus, the gear lies in a plane which is perpendicular to the spindle axis which, for the vertical spindles which are one major use of the invention, provides an arrangement wherein the operating lever moves in a horizontal plane and thereby provides a very advantageous operating position for the operator.

In another embodiment of the invention, the key member is constructed as a pin which extends radially through the spindle sleeve and engages a corresponding bore of the spindle. Said pin carries a bevel gear which can be driven by means of an operating lever, and the bevel gear engages conical teeth on the screw cap. The bevel gear can be integral with the pin and the operating lever, whereby the pin must then have a circular cross section and must be rotatable in the bore of the spindle. It is important that the pin is first guided through the rotationally fixed sleeve so that spindle and sleeve are connected fixedly with respect to rotation and in this manner the entire arrangement cannot escape under the force which is applied on the operating lever by rotation about the spindle axis. The transmission of the clamping or releasing force is provided by bevel teeth so that in this case the axis of the gear is arranged perpendicularly to the axis of the screw cap. In this manner, for example, it is possible to provide for horizontal spindles also a horizontal plane of swing for the operating lever with resulting advantages.

The invention further contemplates arranging a common ratchet between operating lever and gear, which ratchet can be adjusted into either active direction.

BRIEF DESCRIPTION OF THE DRAWINGS

Several exemplary embodiments of the invention are illustrated in the drawings and are described more in detail hereinafter.

In the drawings.

DETAILED DESCRIPTION

Figure 1:
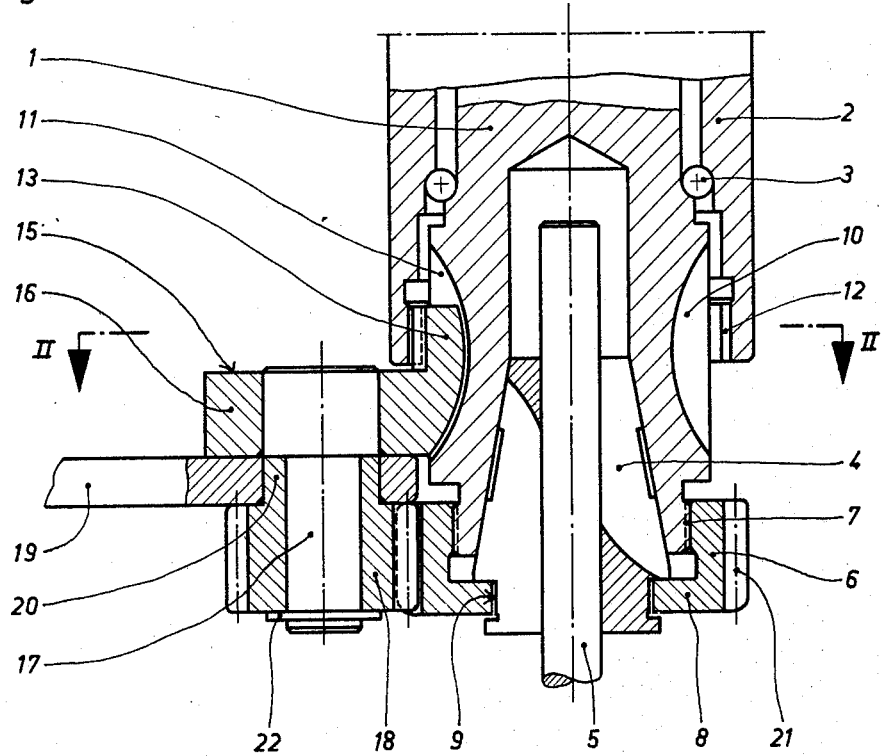
FIG. 1 is a longitudinal cross-sectional view of a tool spindle in the area of the chucking device for the tools.

FIG. 1 illustrates a tool spindle 1 which is rotatably supported in a sleeve 2 through ball bearings 3. The lower end of the tool spindle is provided with a mounting taper for a conical collet 4 which in turn has a bore for receiving a tool 5. The collet is pulled snugly into the mounting taper by a screw cap 6 which engages with its internal thread an external thread 7 of the tool spindle. For this purpose, it is advantageous for the inner flange 8 of the screw cap to engage an annular groove 9 of the collet so that the cap can transfer to the collet both the force required for clamping and also for releasing of same. The inner flange 8 and the annular groove 9 can be constructed in a conventional and therefore not illustrated manner, as by a bayonet slot, so that the screw cap can be released from the collet.

The tool spindle is provided along its periphery with two longitudinal, arcuately shaped, grooves 10, 11. The sleeve 2 has at its lower inner edge axially adjacent the longitudinal grooves the internal teeth 12 (compare also FIG. 2), the operation of which will be described hereinafter.

Figure 2:
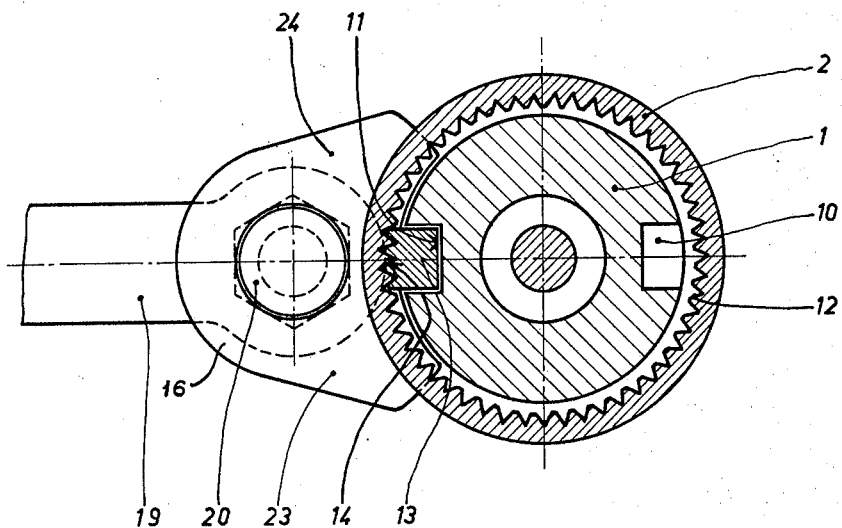
FIG. 2 is a cross-sectional view of a tool spindle corresponding to the line II—II in FIG. 1.

A finger 13 can be moved into the longitudinal grooves, for example, the longitudinal groove 11 in FIGS. 1 and 2, which finger is also arcuately shaped to correspond to the shape of the longitudinal grooves. This finger carries on its side facing the sleeve the teeth 14 which cooperate with the teeth 12. The tool spindle 1 is fixedly connected with respect to rotation to the sleeve 2 by the finger 13 so that the clamping or releasing moment which is applied to the screw cap 6 is eventually received by the sleeve.

The finger 13 is part of a key member 15 which consists substantially of a plate 16 which in operating position is positioned transversely to the spindle axis and which holds a cap screw 17 arranged parallel to the spindle axis. A gear 18 which can be driven by an operating lever 19 is arranged rotatably and secured by means of a snap ring 22 on the cap screw. In the illustrated example the operating lever is a common box wrench which is mounted on a hexagonal hub 20 provided on the gear 18.

The assembly comprising the lever 19, the key 15, the cap screw 17 and gear 18 is mounted in its position of use by inserting the finger 13 from behind into one of the slots 10, 11 and simultaneously rotating such assembly around an axis perpendicular to the plane of the drawing. The weight thereof will then hold it in position as shown. Thus, when the parts are in the position shown in FIG. 1, the finger 13 is engaged within the slot 11 and the spindle is locked against rotation with respect to the sleeve 2 and the teeth of the gear 18 mesh with the teeth of cap 8. However, by clockwise rotation of said assembly about an axis perpendicular to the plane of FIG. 1, the gear 18 will be disengaged from the teeth of cap 8, the finger 13 will be withdrawn from the slot 11 and the device removed to again permit relative rotation between the spindle 1 and the sleeve 2.

As illustrated in FIGS. 1 and 2, the gear when in operating position, namely, when the finger 13 is moved into one of the longitudinal grooves, engages the external teeth 21 of the cap. The screw cap can now be rotated in clamping or releasing direction by the operating lever 19. In practice the operator will normally tighten the screw cap during clamping first manually and then by the described clamping device when the required tensioning moment can no longer be produced manually. The procedure is reversed for release of the screw cap and the collet, the parts being first only released from their engagement after which the screw cap is screwed back manually.

As shown in FIG. 2, the plate 16 is provided with two arms 23, 24 which laterally embrace the spindle 1 and through which the key member can be supported against the spindle.

Figure 3:
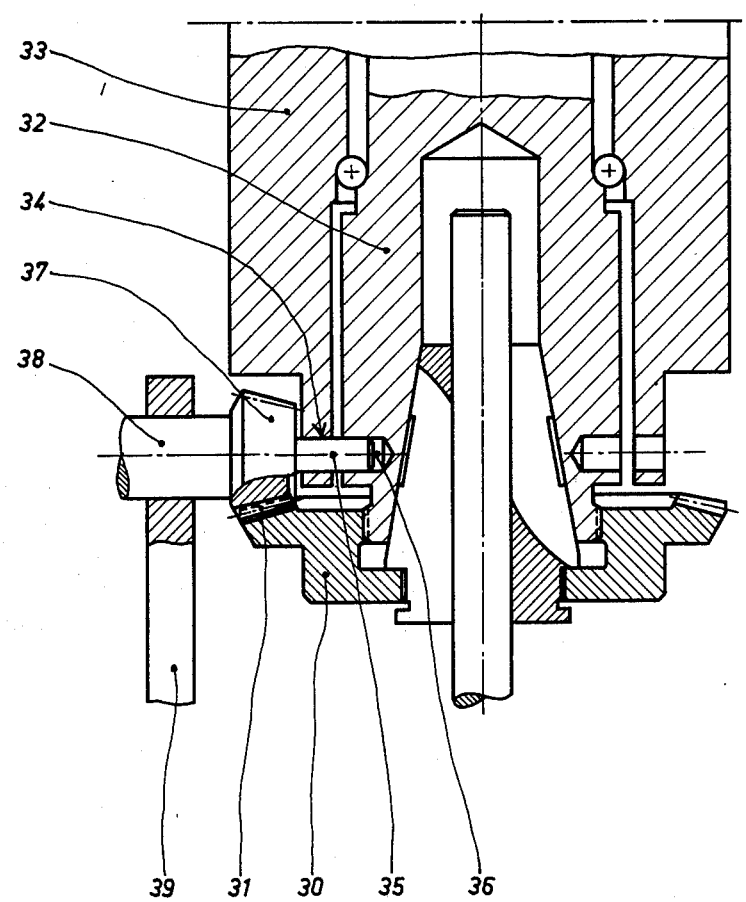
FIG. 3 is a partial longitudinal cross-sectional view of a tool spindle with a different embodiment of the chucking device.

FIG. 3 illustrates a different exemplary embodiment in which the screw cap 30 includes bevel gear teeth 31.

This chucking device also has a key member 34 which fixes with respect to rotation the spindle 32 to the housing part 33, said latter surrounding said spindle. Here the key member is constructed as a simple pin 35 with circular cross section. This pin extends through the housing part and engages a corresponding bore 36 of the tool spindle 32.

The bevel gear 37 which can be formed integrally with the pin 45, the shank 38 and the operating lever 39, meshes with the bevel gear teeth 31 of the screw cap, whereby same can be tightened or loosened through actuation of the operating lever.

Here the assembly comprising the lever 39, the shank 38 and bevel gear 37 merely slides axially within the opening in the housing part 33 within which the key member 34 is mounted. Leftward sliding as appearing in FIG. 3 first disengages the gear 37 from the teeth 31 of the cap 30 and then disengages the pin 35 from the bore 36. The spindle with the associated chuck cap and tool is then free to rotate. Rightward movement of said assembly first causes the pin 35 to enter into the bore 36 to lock the spindle against rotation after which the teeth of the gear 35 engage the teeth of the cap 30 for effecting the desired rotation of said cap with respect to said spindle.

As can be best seen in FIGS. 1 and 3, the plane of swing of the operating lever lies transversely to the spindle axis in the first exemplary embodiment and parallel to the spindle axis in the second exemplary embodiment. Hence, by selection of the specific type of clamping device the absolute direction of movement of the operating lever can also be chosen.

It will, of course, be recognized that at any desired point in the power train of the apparatus, but most conveniently between the operating lever and the gear associated therewith, there can be placed suitable and conventional ratchet means which ratchet means will be selectable for operation in either desired direction. Appropriate ratchet means as such are known and hence not illustrated.

Although a particular preferred embodiment of the invention has been disclosed above for illustrative purposes, it will be understood that variations or modifications thereof which lie within the scope of the appended claims are fully contemplated.

I claim:
1. A tool spindle, comprising:
   stationary hollow sleeve means;
   a hollow spindle rotatably supported in said stationary hollow sleeve means;
   clamping means for clamping a tool mounted in said hollow spindle, said clamping means including a collet movable axially of said spindle to release and grip said tool therein;
   a cap for holding said collet in said hollow spindle;

first fastening means for securing said cap to said hollow spindle;

second fastening means for securing said cap to said collet, said cap being rotatably supported for rotatable movement relative to said hollow spindle by said first fastening means and being further movable axially relative to said hollow spindle in response to said rotation thereof;

key means for connecting said hollow spindle to said hollow sleeve means to prevent said hollow spindle from rotating relative to said hollow sleeve means;

first toothed gear means supported for rotation on said key means and lever means for effecting a manual driving of said first toothed gear means for rotation; and second toothed gear means mounted on said cap, the teeth of said second toothed gear means engaging the teeth of said first toothed gear means so that a rotation of said first toothed gear means will effect a rotation of said cap and a movement of said cap axially of said hollow spindle to move said collet relative to said hollow spindle.

2. A tool spindle according to claim 1, wherein said key means further includes a projection insertable between said hollow sleeve means and said hollow spindle to effect said connection of said hollow sleeve means to said hollow spindle.

3. A tool spindle according to claim 2, wherein said hollow spindle includes means defining a longitudinal groove in the periphery thereof adapted to receive said projection therein; and wherein said projection has teeth thereon; and wherein the internal surface of said stationary hollow sleeve has teeth thereon, said teeth on said projection engaging said teeth on said hollow sleeve means to effect said connection of said hollow sleeve means to said hollow spindle.

4. A tool spindle according to claim 3, wherein said longitudinal groove is arcuately shaped; and wherein said projection has an arcuate shape corresponding to said longitudinal groove to facilitate said insertion of said projection into said longitudinal groove.

5. A tool spindle according to claim 3, wherein said hollow spindle includes means defining a pair of longitudinal grooves.

6. A tool spindle according to claim 3, wherein said first toothed gear means is arranged eccentrically to the axis of said cap; and wherein said second toothed gear means is a spur gear engaged by said teeth on said first toothed gear means.

7. A tool spindle according to claim 1, wherein said lever means is a common wrench which cooperates with hexagonally shaped means provided on said first toothed gear means.

8. A tool spindle according to claim 2, wherein said key means has, in the area of said projection, arms which are laterally spaced and which arms partially embrace said hollow spindle when said key means is in operating position.

9. A tool spindle according to claim 2, wherein said hollow sleeve means and said hollow spindle includes means defining radially aligned holes therein;

wherein said key means includes a pin rotatably received in said radially aligned holes to lock said hollow spindle to said hollow sleeve means;

wherein said first toothed gear means comprises a first bevel gear rotatable about the axis of said pin; and wherein said second toothed gear means comprises a second bevel gear cooperable with said first bevel gear.

* * * * *